Patented Apr. 6, 1954

2,674,595

UNITED STATES PATENT OFFICE 2,674,595

PRODUCTION OF COPPER COMPLEX COMPOUNDS OF O.O'-DIHYDROXYAZO DYESTUFFS

Helmut Pfitzner, Ludwigshafen (Rhine), and Helmut Merkel, Heidelberg, Germany, assignors to Badische Anilin- & Soda-Fabrik Aktiengesellschaft, Ludwigshafen (Rhine), Germany No Drawing. Application October 1, 1949,
Serial No. 119,206

5 Claims. (Cl. 260—148)

This invention relates to a new and efficient process of producing valuable copper complex compounds of o.o'-dihydroxyazo dyestuffs.

Copper complex compounds of this kind have heretofore been made by treating o.o'-dihydroxy or o-hydroxy-o'-methoxy azo dyestuffs in a weakly alkaline or acid medium with copper salts, methanol being split off in the latter case.

We have now found that copper complex compounds of o.o'-dihydroxyazo dyestuffs can be obtained far more simply and economically by treating o-monohydroxyazo compounds having an unsubstituted o'-position, preferably in a slightly acid medium, in the presence of copper salts with oxidizing agents.

The reaction probably proceeds in such a way as to give primarily the rather unstable copper complex compound of the said monohydroxyazo compound which by taking up an oxygen atom in the o'-position from the oxidant is converted into the markedly more stable copper complex compound of the corresponding o.o'-dihydroxyazo compound.

The reactions involved in our process may be represented schematically as follows:

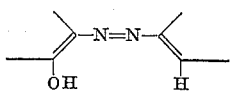

Mono-o-hydroxy azo dyestuff starting material

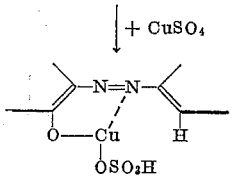

Hypothetical intermediate unstable copper complex salt of the mono-o-hydroxy azo dyestuff

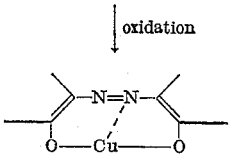

Stable copper complex compound of the o.o'-dihydroxy azo dyestuff formed

Suitable starting materials are principally all o-hydroxyazo compounds obtainable in the conventional manner of coupling aromatic or heterocyclic diazonium salts having an unsubstituted hydrogen atom in an ortho-position to the diazonium group with phenols, naphthols, pyrazolone derivatives and similar substances capable of coupling in ortho-position to their hydroxy group. The o-hydroxyazo compounds may contain water-solubilising groups, for example sulfonic acid groups. Dis- and polyazo compounds containing at least once a hydroxy group in an ortho-position to one of the azo group are also suitable starting materials.

The o-hydroxyazo compounds are treated according to the invention with oxidizing agents in the presence of copper salts. There may be used copper salts containing an inorganic as well as an organic anion, for example copper chloride, copper sulfate or copper acetate. As oxidizing agents are an essential partner in the process of this invention, salts of bivalent copper are preferably used, but the use of cuprous salts is also within the scope of this invention. We prefer to use at least an equivalent amount of a copper salt with reference to the azo group.

Suitable oxidizing agents for performing this invention are preferably all those compounds as are capable of yielding oxygen in a weakly acid medium, for example hydrogen peroxide, alkali metal peroxides, perborates, percarbonates, organic peracids and acyl-peroxides or chromic acid. Anodic oxidation has also proved an efficient oxidizing method in the practice of our invention.

When starting from water-soluble o-hydroxyazo compounds, we prefer to carry out the reaction in aqueous solution. Organic solvents may be added, if necessary; they should be resistant to the oxidizing agent used. Water-insoluble o-hydroxyazo compounds may be reacted in an organic solvent, such as acetic acid, butanediol-1.4 etc.

The copper complex compounds of o.o'-dihydroxyazo compounds thus obtained in very good yields are useful in many fields of application in industry. If they are soluble in water they may be used immediately for dyeing leather or wool, dyestuffs of the substantive type may serve for the dyeing of cotton and rayon. The dyestuffs may, however, also be freed from copper in the conventional manner, for instance by treating them with strong mineral acid or with alkali metal sulfides. The free o.o'-dihydroxyazo compounds thus obtained may be used as starting materials for the manufacture of other metal complex compounds of the o.o'-dihydroxyazo compounds, for example of chromium complex compounds, or directly as dyestuffs to be afterchromed on the fibre.

In a general aspect our invention allows of producing in a simple and efficient manner o.o'- dihydroxyazo compounds and any metal complex compounds thereof. The prior art manufacture of this important type of dyestuffs started from diazotized aromatic o-hydroxyamines which had to be coupled with phenols, naphthols etc., these ortho-hydroxylated amines being in most cases but difficult to obtain and hard to diazotize. Another known process comprises starting from diazotized aromatic o-methoxyamines, these being more easily diazotizable and their diazonium salts being coupled with phenols or similar substances to give o-hydroxy-o'-methoxyazo compounds which in turn are subjected to a demethylizing treatment, for example with copper salts, thus yielding the corresponding copper complex compounds which can be de-coppered to give the free o.o'-dihydroxyazo compounds. By contrast, our present invention allows one to start from aromatic or heterocyclic diazotizable amines having no substituent in the ortho-position, these amines being more readily available and easier to diazotize and coupling more smoothly with phenols etc. than the orthohydroxy or other-methoxy substituted amines used in the prior art.

Our invention, therefore, not only provides an improved and highly convenient method of producing copper complex compounds of those o.o'-dihydroxyazo compounds or the free o.o'-dihydroxy azo compounds or other metal complex compounds thereof which were hitherto known, but also provides the possibility of synthesizing new compounds of the said type which could hitherto not be prepared.

The following examples serve to illustrate how our invention may be carried out in practice. The parts are by weight.

*Example 1.*—47.9 parts of the monohydroxyazo dyestuff obtained by coupling diazotized 1-aminonaphthalene-4-sulfonic acid with 1-hydroxynaphthalene-5-sulfonic acid in the usual manner, are dissolved in 500 parts of water. A solution of 27.5 parts of crystallized copper sulfate in 300 parts of water is allowed to run in, and then 30 parts of crystallized sodium acetate are added at 60° C., while stirring. Stirring of the mixture at the said temperature is continued, and a solution of 21.3 parts of 40 per cent hydrogen peroxide in 100 parts of water is run in within 30 minutes, the solution turning from red to blue. The copper-complex dyestuff obtained by salting out etc. may be de-coppered, for example, by treatment with strong hydrochloric acid. When treating the free o.o'-dihydroxyazo dyestuff thus formed with chromium salts by one of the conventional methods, the known chromium complex dyestuff is obtained which dyes wool fast reddish blue shades.

Similar dyestuffs are obtained by starting from monohydroxyazo compounds produced by coupling 1-aminonaphthalene-4-sulfonic acid with 1-hydroxynaphthalene-3-sulfonic acid, 1-hydroxynaphthalene-4-sulfonic acid, 2-hydroxynaphthalene-4-sulfonic acid, 2-hydroxynaphthalene-5-sulfonic acid, 2-hydroxynaphthalene-6-sulfonic acid or 2-hydroxynaphthalene-7-sulfonic acid, respectively, the dyestuffs derived from 1-hydroxynaphthalene-3-sulfonic acid giving the most greenish blue shades.

Instead of using hydrogen peroxide as the oxidation agent, the same result may be achieved by anodic oxidation.

*Example 2.*—47.9 parts of the monohydroxyazo dyestuff obtained by coupling diazotized 2-naphthylamine-6-sulfonic acid with 1-naphthol-4-sulfonic acid are dissolved in 2000 parts of water of 70° C. To this solution 22 parts of copper acetate and 60 parts of 20 per cent acetic acid are added. While maintaining the said temperature, a suspension of 30.8 parts of sodium perborate in 150 parts of water is introduced into the solution drop by drop, while stirring, in the course of 30 minutes. The copper complex compound of the o.o'-dihydroxyazo dyestuff thus formed may be converted by treatment with conc. hydrochloric acid into the free o.o'-dihydroxyazo dyestuff which in turn, by treatment with chromium salts in the conventional manner, may be converted into its known complex chromium derivative dyeing wool fast blue shades.

In an analogous manner, the monohydroxyazo dyestuffs produced by coupling diazotized 2-naphthylamine-6-sulfonic acid with 2-naphthol-6-sulfonic acid, or diazotized 2-naphthylamine with 1-naphthol-3.8-disulfonic acid, or diazotized 1-naphthylamine with 1-naphthol-3.8-disulfonic acid yield copper complex compounds of the corresponding o.o'-dihydroxyazo dyestuffs which may by de-copperisation and afterchromation be converted into chromium dyestuffs, dyeing wool fast blue shades.

*Example 3.*—29.2 parts of the monohydroxyazo dyestuff obtained by coupling diazotized 1-amino-benzene-4-sulfonic acid with 1-hydroxy-4-methylbenzene are dissolved in 2000 parts of water. To the solution 41 parts of sodium acetate, 27.5 parts of copper sulfate and 90 parts of 20 per cent acetic acid in 500 parts of water are added, the whole being warmed to 60° C. Then 19.5 parts of sodium peroxide, dissolved in 100 parts of water, are run in within 60 minutes, while stirring. When oxidation is completed the complex copper compound of the o.o'-dihydroxyazo dyestuff is salted out, filtered off by suction, dissolved in water and admixed under short boiling with an equal amount of conc. hydrochloric acid. After cooling to 20° C., the free o.o'-dihydroxyazo dyestuff precipitates. It may be used for dyeing wool maroon shades according to the afterchromation method.

By using as starting materials monohydroxyazo compounds obtained by coupling diazotized 4-nitroaniline-2-sulfonic acid, 4-nitro-anilin-3-sulfonic acid, 2-nitro-aniline-4-sulfonic acid or 3-nitroaniline-4-sulfonic acid with 1-hydroxy-4-methylbenzene or other phenols coupling in ortho-position, treating them as above and de-coppering, o.o'-dihydroxyazo dyestuffs are obtained which dye wool from brownish violet to medium brown shades by the afterchromation process.

*Example 4.*—48.7 parts of the azo dyestuff obtained by coupling diazotized 1-aminonaphthalene-4-sulfonic acid with 1(4'-sulfophenyl)-3-methylpyrazolone-(5) are dissolved in 2000 parts of water at 50° C. Then 34 parts of sodium acetate are added, while a solution of 27.5 parts of copper sulfate in 300 parts of water and another solution of 14.5 parts of 40 per cent hydrogen peroxide in 100 parts of water are simultaneously allowed to flow in within 30 minutes at 50° C., the copper sulfate solution being ahead of the hydrogen peroxide solution by 50 parts. After several hours, the copper complex o.o'-dihydroxyazo dyestuff formed is salted out and filtered off. The de-coppered dyestuff, after having been converted into its chromium complex compound by means of chromium formiate, dyes wool pink shades of a bluish tint.

*Example 5.*—To a solution of 16 parts of a 25 per cent caustic soda solution of 44.3 parts of the disazo dyestuff paranitroaniline→resorcin← 1-aminobenzene-3-sulfonic acid in 1500 parts of water, there are added simultaneously within a few seconds, at 50° C., while stirring, a solution of 50 parts of copper sulfate and 30 parts of 20 per cent acetic acid in 500 parts of water and a solution of 21.3 parts of 40 per cent hydrogen peroxide in 100 parts of water. After working up the reaction mixture in the conventional manner a copper complex dyestuff is obtained which dyes leather vigorous neutral brown shades. By using 1-aminobenzene-4-sulfonic acid instead of 1-aminobenzene-3-sulfonic acid or using m-nitroaniline instead of p-nitroaniline dyestuffs are obtained which dye leather similar brown shades.

*Example 6.*—49.8 parts of the azo dyestuff obtained by coupling diazotized 2.4-dinitro-aniline with 2-napthol-3.6-disulfonic acid, 37.5 parts of copper sulfate and 41 parts of sodium acetate are dissolved in 1500 parts of water. Said solution is oxidized by adding a solution of 51 parts of 40 per cent hydrogen peroxide in 200 parts of water at 75° C., while stirring. The solution now containing the copper complex of an o.o'-dihydroxy azo dyestuff is de-coppered by adding an excess of conc. hydrochloric acid. The copper-free dyestuff may be chromed in the conventional manner giving the corresponding chromium complex dyestuff which dyes wool blue shades.

*Example 7.*—81.4 parts of the disazo dyestuff obtained by coupling tetrazotized benzidine with 2 mols of 1-naphtol-3.8-disulfonic acid, 16 parts of a 25 per cent caustic soda solution and 2.5 parts of Turkey red oil are dissolved in 3000 parts of water while warming and admixed with a solution of 55 parts of copper sulfate, 30 parts of 20 per cent acetic acid and 47 parts of sodium acetate in 500 parts of water. The solution is allowed to cool to room temperature and, after 51 parts of 40 per cent hydrogen peroxide have been added, agitated for 24 hours. The copper complex dyestuff thus obtained is salted out, filtered off by suction, washed with a common salt solution and dried. It dyes untreated cotton reddish blue shades.

*Example 8.*—73.2 parts of the disazo dyestuff obtained by coupling tetrazotized 1.4-diaminobenzene with 2 mols of 2-naphthol-3.6-disulfonic acid, 16 parts of a 25 per cent caustic soda solution and 2.5 parts of Turkey red oil are dissolved in 3000 parts of water. To this solution there are simultaneously and quickly added, at 60° C., while stirring, the solution of 55 parts of copper sulfate, 60 parts of 20 per cent acetic acid and 55 parts of sodium acetate in 500 parts of water and the solution of 25.5 parts of 40 per cent hydrogen peroxide in 150 parts of water. By de-coppering the copper-complex dyestuff obtained and converting it into the chromium complex compound by the method described above a dyestuff is obtained which dyes wool or leather bluish black shades. Similar dyestuffs are obtained by using 1.3-phenylene-diamine or 1.5-napthylenediamine instead of 1.4-phenylene-diamine as tetrazo components.

*Example 9.*—A solution of 51 parts of 40 per cent hydrogen peroxide in 200 parts of water is introduced drop by drop at 65° C., within 30 minutes, to a solution containing 44.3 parts of the azo dyestuff obtained by coupling diazotized 3-chloraniline with 2-naphthol-6.8-disulfonic acid, and 22 parts of copper acetate in 1500 parts of water. The copper complex dyestuff obtained is decoppered and treated with chromium salts to give a chromium complex dyestuff which dyes wool red-violet shades. A dyestuff giving blue-violet shades is obtained by starting from 2-naphtol-6-sulfonic acid instead of 2-naphthol-6.8-disulfonic acid.

*Example 10.*—37.7 parts of the azo dyestuff obtained by coupling diazotized 1-naphthylamine-5-sulfonamide with β-naphthol are dissolved in 3000 parts of 1.4-butyleneglycol with the addition of 16 parts of a 25 per cent caustic soda solution. After adding a solution of 27.5 parts of copper sulfate, 60 parts of 20 per cent acetic acid and 13.6 parts of sodium acetate in 200 parts of water at 80° C., the mixture is oxidized by adding 51 parts of 40 per cent hydrogen peroxide in 200 parts of water and stirring at the same temperature for 20 hours. After decoppering the copper complex compound obtained by adding a sodium sulfide, dissolving, filtering off the copper sulfide, salting out the de-coppered o.o'-dihydroxy azo dyestuff and chroming it in the usual manner with chromium formiate in a formamide solution, a dyestuff is obtained which dyes wool from neutral baths fast blue shades. Instead of butyleneglycol, ethanol or other solvents may be used.

What we claim is:

1. A process for the production of stable copper complex compounds of o,o'-dihydroxy azo dyestuffs which comprises oxidizing ortho-monohydroxy azo dyestuffs derived from diazotized amines selected from the class consisting of aniline and toluidines and their nitro and chloro derivatives, benzidine, 1,4-diaminobenzene, α- and β-naphthylamines and their sulfonic acids having an unsubstituted ortho position to the diazo groups, and hydroxylated cyclic coupling components which couple in alkaline solutions in ortho position to the hydroxyl group and selected from the class consisting of phenols, naphthols and pyrazolones and their sulfonic acids in a weakly acid aqueous medium with hydrogen peroxide in the presence of at least an equivalent amount, with reference to one azo group, of a water soluble copper salt.

2. A process for the production of stable copper complex compounds of o.o'-dihydroxy mono azo dyestuffs which comprises adding an aqueous solution of hydrogen peroxide at temperatures between 20 and 80° C. to a weakly acid mixture of an aqueous solution of at least an equivalent amount, with reference to the azo group, of a copper salt and of an ortho-monohydroxy mono azo dyestuff derived from a diazotized amine selected from the class consisting of aniline and toluidines and their nitro and chloro derivatives and α- and β-naphthylamines and their sulfonic acids having an unsubstituted ortho position to the diazo group, and hydroxylated cyclic coupling compounds which couple in alkaline solutions in ortho position to the hydroxyl group and selected from the class consisting of phenols, naphthols and pyrazolones and their sulfonic acids.

3. A process for the production of stable copper complex compounds of bis-(o,o'-dihydroxy azo) dyestuffs which comprises adding an aqueous solution of hydrogen peroxide at temperatures between 20 and 80° C. to a weakly acid mixture of an aqueous solution of at least an equivalent amount, with reference to one azo group, of a copper salt and of a bis-(mono-hydroxy azo) dyestuff derived from one molecule of a tetrazotized diamine selected from the class consisting of benzidine and 1.4-diamino-benzene having unsubstituted ortho positions to the diazo groups, and two molecules of a naphthol sulfonic acid which couples in alkaline solution in ortho position to the hydroxyl group.

4. A process for the production of stable copper complex compounds of bis-(o,o'-dihydroxy azo) dyestuffs which comprises adding an aqueous solution of hydrogen peroxide at temperatures between 20 and 80° C. to a weakly acid mixture of an aqueous solution of at least an equivalent amount, with reference to one azo group, of a copper salt and of a bis-(mono hydroxy azo) dyestuff derived from two molecules of diazotized amines selected from the class consisting of aniline and toluidines and their nitro and chloro derivatives and their sulfonic acids having an unsubstituted ortho position to the diazo group, and one molecule of resorcin.

5. The process for the production of the stable copper complex compound of a bis-(o,o'-dihydroxy azo) dyestuff which comprises adding at about 50° C. an aqueous solution of hydrogen peroxide and a mixture of an aqueous solution of copper sulfate and acetic acid to a caustic soda solution of the disazo dyestuff obtained by coupling one molecule of a diazotized nitro aniline and one molecule of an aniline sulfonic acid with one molecule of resorcin, the amount of copper salt being at least equivalent to both azo groups and the amount of acetic acid being great enough to render the reaction mixture weakly acid.

References Cited in the file of this patent

UNITED STATES PATENTS

| Number | Name | Date |
|---|---|---|
| 1,848,772 | Felix | Mar. 8, 1932 |
| 2,039,898 | Gyr | May 5, 1936 |
| 2,945,090 | Lange et al. | June 23, 1936 |
| 2,230,686 | Holzach et al. | Feb. 4, 1941 |
| 2,396,328 | Kvalnes et al. | Mar. 12, 1946 |
| 2,529,444 | Bestehorn et al. | Nov. 7, 1950 |
| 2,539,178 | Bestehorn | Jan. 23, 1951 |

FOREIGN PATENTS

| Number | Country | Date |
|---|---|---|
| 594,325 | Great Britain | Nov. 7, 1947 |